United States Patent
Hsu et al.

(10) Patent No.: US 11,454,243 B2
(45) Date of Patent: Sep. 27, 2022

(54) ARTIFICIAL INTELLIGENCE TRAINING METHOD FOR A TARGET MODEL BASED ON THE LABEL MATRIX

(71) Applicant: INDUSTRIAL TECHNOLOGY RESEARCH INSTITUTE, Hsinchu (TW)

(72) Inventors: Ming-Hsiang Hsu, Hsinchu (TW); Chun-Chieh Wang, Hsinchu (TW); Hung-Tsai Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 408 days.

(21) Appl. No.: 16/793,020

(22) Filed: Feb. 18, 2020

(65) Prior Publication Data

US 2021/0079925 A1 Mar. 18, 2021

(30) Foreign Application Priority Data

Sep. 18, 2019 (TW) .................................. 108133671

(51) Int. Cl.
*F04D 27/00* (2006.01)
*F04D 19/04* (2006.01)
(Continued)

(52) U.S. Cl.
CPC .......... *F04D 27/001* (2013.01); *F04D 19/04* (2013.01); *G06K 9/6247* (2013.01);
(Continued)

(58) Field of Classification Search
CPC ... F04D 27/001; F04D 19/04; G06K 9/00536; G06K 9/6256; G06K 9/6247;
(Continued)

(56) References Cited

U.S. PATENT DOCUMENTS 6,289,735 B1 9/2001 Dister et al.
6,301,572 B1 10/2001 Harrison
(Continued)

FOREIGN PATENT DOCUMENTS

CN 1230869 12/2005
CN 101080699 11/2007
(Continued)

OTHER PUBLICATIONS

Taiwanese Office Action for Taiwanese Patent Application No. 108133671 dated Sep. 10, 2020.
(Continued)

*Primary Examiner* — Pakee Fang
(74) *Attorney, Agent, or Firm* — Amin, Turocy & Watson, LLP

(57) ABSTRACT

A data processing method is proposed, including: sensing, via at least one sensing portion, target information of a target device; receiving and processing, via an electronic device, the target information of the sensing portion to form feature information; processing, via the electronic device, the feature information into a label matrix, and establishing, via an artificial intelligence training method, a target model based on the label matrix; and after the electronic device captures real-time information of the target device, predicting, via the target model, a life limit of the target device, wherein a content of the target information is corresponding to a content of the real-time information. Thus, a good target model is constituted and is advantageous in training artificial intelligence by processing the feature information into the label matrix.

13 Claims, 19 Drawing Sheets

(51) Int. Cl.
*G06N 20/00* (2019.01)
*G06K 9/62* (2022.01)
*G06N 3/08* (2006.01)

(52) U.S. Cl.
CPC .............. *G06K 9/6256* (2013.01); *G06N 3/08* (2013.01); *G06N 20/00* (2019.01)

(58) Field of Classification Search
CPC ......... G06F 17/00; G06F 17/16; G06Q 10/04; G06N 3/08; G06N 20/00; G06N 3/0454; F05D 2260/81; F05D 2260/821; F05D 2260/94; F05D 2270/807
See application file for complete search history.

(56) References Cited

U.S. PATENT DOCUMENTS

| | | | |
|---|---|---|---|
| 6,865,513 | B2 | 3/2005 | Ushiku et al. |
| 8,493,216 | B2 * | 7/2013 | Angell .................. G06F 16/284 382/116 |
| 11,169,502 | B2 * | 11/2021 | Xia ........................ G06N 20/00 |
| 2009/0110236 | A1 * | 4/2009 | Huang .................... G06T 7/254 382/103 |
| 2010/0302247 | A1 * | 12/2010 | Perez ..................... G06V 20/64 382/103 |
| 2013/0051634 | A1 * | 2/2013 | Mirski-Fitton .... G06V 30/1423 382/314 |
| 2015/0134271 | A1 | 5/2015 | Ikejiri et al. |

FOREIGN PATENT DOCUMENTS

| | | |
|---|---|---|
| CN | 101080700 | 11/2007 |
| CN | 100476663 | 4/2009 |
| CN | 102402727 | 4/2012 |
| CN | 102693450 | 9/2012 |
| CN | 106089753 | 1/2018 |
| TW | 591688 | 6/2004 |
| TW | I234610 | 6/2005 |
| TW | I250271 | 3/2006 |
| TW | I447302 | 8/2014 |
| TW | 201640244 | 11/2016 |

OTHER PUBLICATIONS

Thanagasundram, et al. "A case study of autoregressive modelling and order selection for a dry vacuum pump", ResearchGate; 2005; 10.

Konishi, et al. "Diagnostic system to determine the in-service life of dry vacuum pumps", IET; 1999; 7.

Kacprzynski, et al. "A Prognostic Modeling Approach for Predicting Recurring Maintenance for Shipboard Propulsion Systems", ASME; 2001; 7.

Twiddle, et al. "Fuzzy model-based condition monitoring of a dry vacuum pump via time and frequency analysis of the exhaust pressure signal", SAGE journals; 2008; 7.

Choi, "Modeling and Model Based Fault Diagnosis of Dry Vacuum Pumps in the Semiconductor Industry", 2013; 212.

Butler, et al. "Prediction of Vacuum Pump Degradation in Semiconductor Processing", Elsevier; 2009; 6.

* cited by examiner

| raw data_1 | raw data_2 | raw data_3 | raw data_4 | raw data_5 | raw data_6 |
|---|---|---|---|---|---|
| 2018 | 11 | 48 | 0.166350727 | 0.30923625 | 0.035622769 |
| 2018 | 11 | 49 | 0.162946772 | 0.306487248 | 0.035866904 |
| 2018 | 11 | 50 | 0.167479865 | 0.309438424 | 0.034032146 |
| 2018 | 11 | 51 | 0.172245786 | 0.321935434 | 0.034772846 |
| 2018 | 11 | 52 | 0.180348127 | 0.314325694 | 0.038590703 |
| 2018 | 11 | 53 | 0.162886738 | 0.311176193 | 0.039837239 |
| 2018 | 11 | 54 | 0.158650967 | 0.320976999 | 0.035590226 |
| 2018 | 11 | 55 | 0.168516044 | 0.311282082 | 0.033843391 |
| 2018 | 11 | 56 | 0.173173282 | 0.306291876 | 0.031400236 |
| 2018 | 11 | 57 | 0.178254864 | 0.327282101 | 0.042723227 |
| 2018 | 11 | 58 | 0.167351856 | 0.3620975 | 0.036501252 |

FIG. 3C

| 2.966783940345558 |
| 22.235056313243 |
| 0.966670594950900 |
| -7.111350356652514 |
| -12.224140216135 |
| -0.810369031731804 |
| 7.894336201638 |
| -0.163344826419795 |
| 4.971404538536 |
| -19.294892076 |

| | | | |
|---|---|---|---|
| -0.678391683109253 | -0.361944099167275 | 4.450066175528 | 2.691059074127 02 |
| -4.213847756040407 | -0.027578043978970 0 | 4.339850116355 18 | 3.951689821091 8 |
| -2.214280720903371 | 0.837274554431810 | -1.480889805115428 | -2.759912132031 53 |
| -2.607201586993266 | -2.224194216280037 | -1.545768288615 28 | -3.816564073282 64 |
| -0.695538966391872 | -1.117078381113838 | 3.097813209535 140 | 3.816564073328 35 |
| 2.813286852087744 | -4.037043690305921 | -0.285799212173231 | 6.023903733383 5 |
| -0.470839157649840 | 2.579894096092595 | 2.065290091526 44 | -1.742467891896 66 |
| 3.554302807760060 | 2.106907580025 2805 | 2.106777590317 4 | 2.073513727866 18 |
| 6.078360590911 77 | 0.639075800252805 | -9.935081563582 74 | -2.247973810494 6 |
| -7.401494405484 71 | -9.169002270630 89 | -7.064795023134 64 | -3.138482961244 51 |
| -0.054824780241 7797 | -8.377614631707 04 | -2.237978309503 88 | -7.179635105107 0 |
| -0.634807107492 623 | -2.103912770990 97 | -0.678596721827 005 | 2.240777511120 30 |
| 2.497145972720 28 | -2.320246156740 28 | -2.237978309503 88 | -3.422932967919 48 |
| 2.160776877641 111 | 6.438237849584 17 | 6.743107754244 26 | 2.890782030070 46 |
| 0.346810981602 590 | 3.508641806710 16 | 7.164979968826 0 | 7.885414548220 44 |
| 1.712779293714 2 | 1.452104660871 412 | -2.608764327784 04 | -0.464106081811 412 |
| 1.698726318247 54 | 3.581949193159 31 | -2.690556340081 066 | -1.710030730640 96 |
| 1.474409513635 92 | 4.773118098197 42 | -6.070410494427 6 |
| 3.092970836367 319 | -0.286428860029 899 | -0.733249210675 323 |
| 3.677166907622 69 | -11.125916076263 5 | -7.235674416356 47 | -7.929807062776 37 |
| -7.742431948068 2 | -8.930305180814 32 | -11.159707434179 7 | -9.459389815153 95 |
| -9.226901121869 67 | | | |

FIG. 5C'

| 11.045867011 6783 | -27.740847987 1562 | -1.1882544 3450947 | 1.76709770587607 | 1.08223620791639 |
|---|---|---|---|---|
| -4.51259504552133 | -4.84029101327150 | 4.96102930885454 | 9.63156933669639 | -7.60361940705872 |

ARTIFICIAL INTELLIGENCE TRAINING METHOD FOR A TARGET MODEL BASED ON THE LABEL MATRIX

CROSS-REFERENCE TO RELATED APPLICATIONS

This application claims priority to Taiwan Application Serial No. 108133671, filed on Sep. 18, 2019. The entirety of the above-mentioned patent application is hereby incorporated by reference herein and made a part of this specification.

BACKGROUND

Technical Field

The present disclosure relates to data processing methods, and, more particularly, to a data processing method and a data processing system that predict a life limit of a vacuum pump.

Background

When a semiconductor wafer is fabricated, a vacuum pump is used to clean the dust of a working chamber. The vacuum pump will be degraded gradually, and cannot clean the dust in an effective way. Therefore, the degraded vacuum pump has to be replaced.

In the prior art, operators replace a vacuum pump based on their experiences. However, the operators sometimes replace a vacuum pump that is still functioning very well or is already malfunctioned for a period of time.

Patent application publication no. WO/2006/064990 provides a method for sensing a vacuum pump automatically, and predicts a life limit of the vacuum pump according to a complicated calculation process, which takes much time to be performed, and the accuracy of the prediction is limited, thereby not meeting the needs of the modern semiconductor wafer fabrication process for the immediate replacement of vacuum pumps.

Therefore, how to replace a vacuum pump that is degraded already in appropriate time is becoming an urgent issue in the art.

SUMMARY

The present disclosure provides a data processing method of a vacuum pump, comprising: sensing, via at least one sensing portion, target information of a target device; receiving and processing, via an electronic device, the target information of the sensing portion to form feature information; processing, via the electronic device, the feature information into a label matrix, and establishing, via an artificial intelligence training method, a target model based on the label matrix; and after the electronic device captures real-time information of the target device, predicting, via the target model, a life limit of the target device, wherein a content of the target information is corresponding to a content of the real-time information.

The present disclosure also provides a data processing system of a vacuum pump, comprising: a sensing portion configured for sensing target information of a target device; a reception portion communicatively connected to the sensing portion and configured for receiving and processing the target information to form feature information; a label portion communicatively connected to the reception portion and configured for processing the feature information into a label matrix, where a target model is established by an artificial intelligence training method based on the label matrix; and a prediction portion communicatively connected to the reception portion and the label portion and configured for predicting a life limit of the target device via the target model after real-time information of the target device is captured, wherein a content of the target information is corresponding to a content of the real-time information.

In an embodiment, the electronic device labels the feature information according to a cumulative method and a principal component analysis method. In another embodiment, the cumulative method converts the feature information before accumulation into a cumulative feature after accumulation. In yet another embodiment, the label matrix is obtained by calculating the cumulative feature after accumulation according to the principal component analysis method and a min-max normalization method.

In an embodiment, the feature information includes data of the target device at a working stage, without including data of the target device when a machine is at an idling stage, a maintenance stage and/or a shutdown stage and has no load.

In an embodiment, the sensing portion is an acceleration sensor connected to the target device.

In an embodiment, the target device is a vacuum pump in communication with a working chamber of a semiconductor wafer fabrication process.

In an embodiment, the target model is a deep learning model constituted by a neural network calculation mechanism.

In an embodiment, the real-time information is processed by the electronic device and input to the target model, and the electronic device obtains predicted information of a life limit of the target device.

The present disclosure further provides a non-transitory computer readable medium stored with a program, which, when loaded into and executed by a computer, achieves the previously described data processing method.

In the data processing method and the data processing system according to the present disclosure, the label portion processes the feature information into the label matrix, and a good target model is thus constituted and is advantageous in training artificial intelligence. Compared with the prior art, the present disclosure employs a simple calculation process of the target model when predicting a life limit of a vacuum pump. The life time can be predicted very quickly and accurately. Therefore, the demand required by a modern semiconductor wafer fabrication process for the replacement of a vacuum pump is satisfied.

BRIEF DESCRIPTION OF DRAWINGS

FIG. 3C is a table illustrating feature information according to the present disclosure.

FIGS. 4D-1 and 4D-2 illustrate a limit normalization process of a data processing method according to the present disclosure.

FIGS. 5B and 5C are parameter tables used by data processing method when constituting bias_weighting of a target model according to the present disclosure.

FIGS. 5B' and 5C' are parameter tables of input_weighting corresponding to FIGS. 5B and 5C, respectively.

DETAILED DESCRIPTION

Figure 1A:
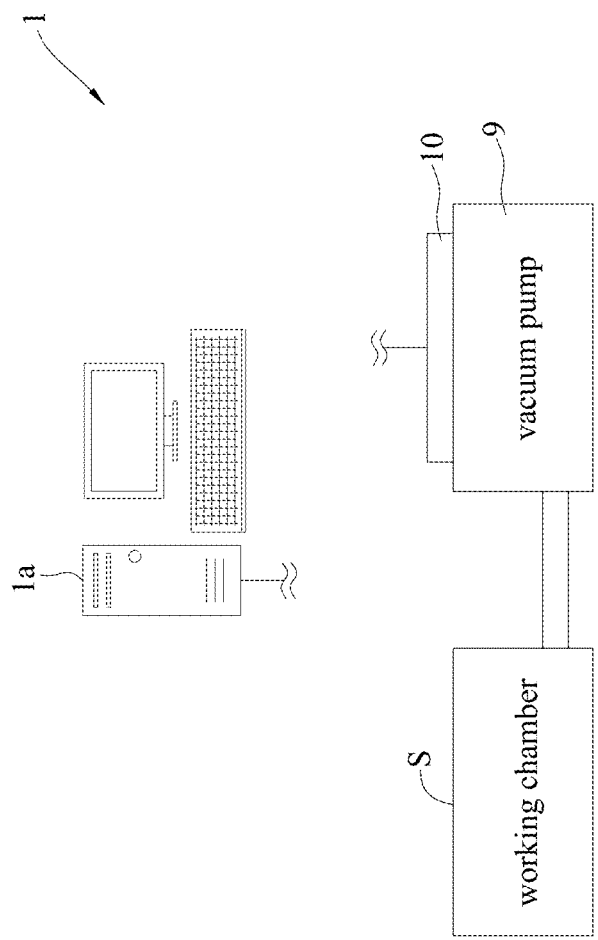
FIG. 1A is a schematic diagram showing a configuration of an application of a data processing system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terminology used herein is for the purpose of describing particular devices and methods and is not intended to be limiting of this disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

Figure 1B:
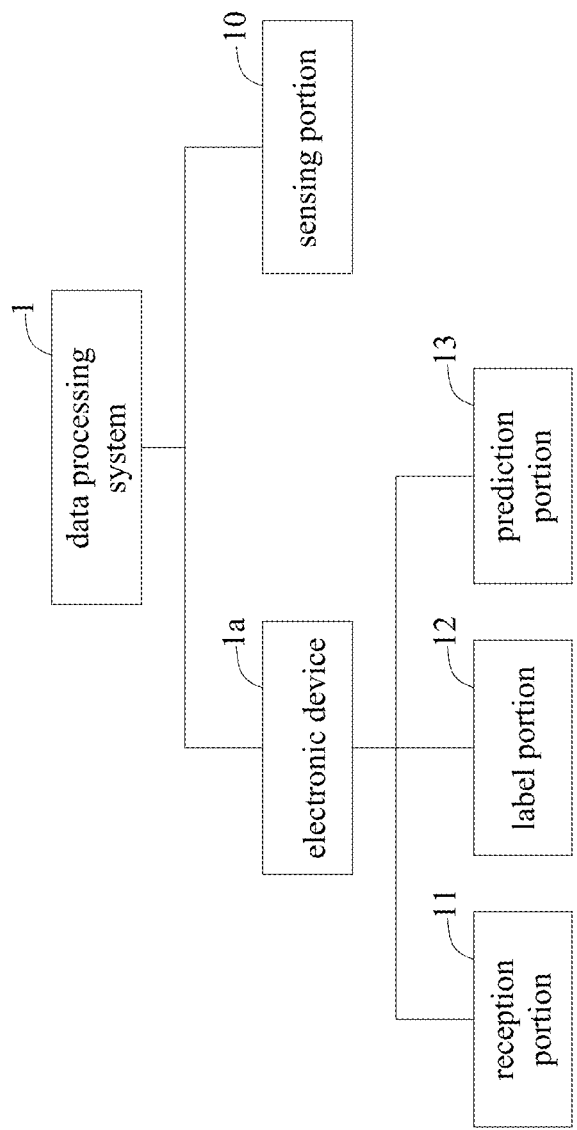
FIG. 1B is a functional block diagram of a data processing system according to the present disclosure.

FIGS. 1A and 1B are schematic diagrams illustrating an application and an architecture configuration of a data processing system 1 according to the present disclosure. As shown in FIGS. 1A and 1B, the data processing system 1 comprises a sensing portion 10 and an electronic device 1a communicatively connected to each other. The sensing portion 10 senses target information of a target device 9. The electronic device 1a is provided with, but not limited to, a reception portion 11, a label portion 12 and a prediction portion 13.

In an embodiment, the electronic device 1a is a computer. The target device 9 includes a booster and/or a vacuum pump (e.g., a dry pump). The vacuum pump is in communication with a working chamber S of a semiconductor wafer fabrication process.

In an embodiment, the sensing portion 10 is an acceleration sensor (e.g., an acceleration meter) and is disposed on the target device 9.

In an embodiment, two acceleration meters (the sensing portion 10) are installed on the target device 9, such as the booster, in the axial direction and the radius direction, respectively. Two acceleration meters (the sensing portion 10) are installed on the target device 9, such as a dry pump combination of a high pressure (HP) machine and a low pressure (LP) machine, respectively.

The reception portion 11 is communicatively connected to the sensing portion 10 and receives and processes the target information to form feature information.

In an embodiment, the feature information includes data of the target device 9 at a working stage, without including data of the target device 9 when a machine is at an idling stage, a maintenance stage and/or a shutdown stage and has no load.

The label portion 12 is communicatively connected to the reception portion 11 and processes the feature information into a label matrix, and an artificial intelligence training method establishes the label matrix into a target model.

In an embodiment, the label portion 12 processes the feature information according to a cumulative method and a principal component analysis (PCA) method. In an embodiment, the cumulative method converts the feature information before accumulation into a cumulative feature after accumulation. In another embodiment, the label portion 12 obtains the label matrix by calculating the cumulative feature according to the principal component analysis method and a min-max normalization method.

In an embodiment, the target model is a deep learning model constituted by a neural network calculation mechanism.

The prediction portion 13 is communicatively connected to the reception portion 11 and the label portion 12, and, after real-time information of the target device 9 is captured, predicts a life limit of the target device 9 based on the target model. A content of the target information is corresponding to a content of the real-time information.

In an embodiment, the real-time information is processed by the reception portion 11 and the label portion 12 and input to the target model, and the prediction portion 13 obtains predicted information of a life limit of the target device 9.

In an embodiment, the content of the target information and the content of the real-time information are in the same unit. In another embodiment, the content of the target information and the content of the real-time information have different values.

Figure 2:
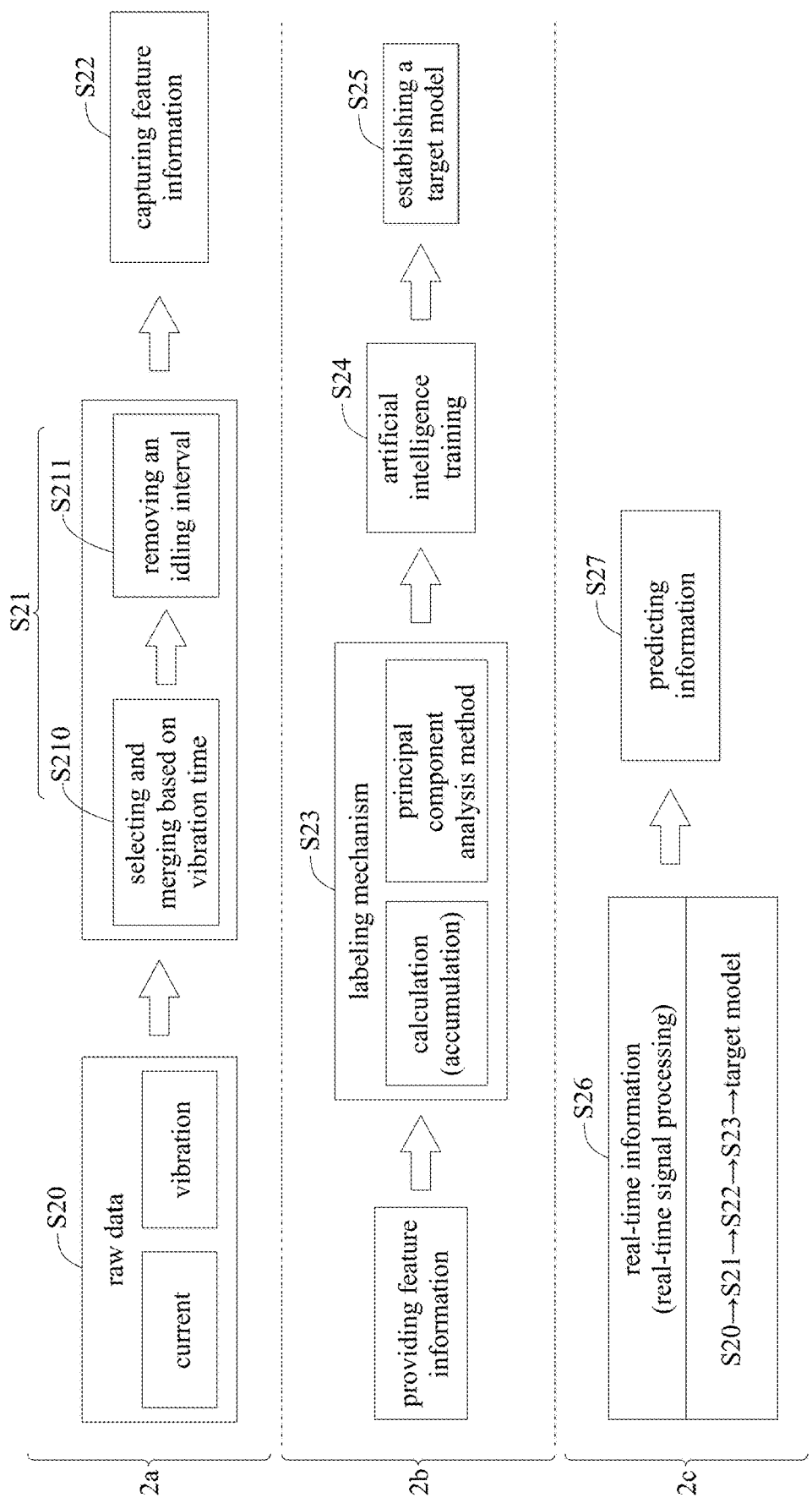
FIG. 2 is a flow chart illustrating a data processing method according to the present disclosure.

FIG. 2 is a flow chart illustrating a data processing method according to the present disclosure. As shown in FIG. 2, the data processing method employs the data processing system 1 to perform a leading process 2a, a molding process 2b and a predicting process 2c sequentially. The leading process 2a comprises steps S20-S22. The molding process 2b comprises steps S23-S25. The predicting process 2c comprises steps S26 and S27.

In step S20, the sensing portion 10 senses target information of the target device 9.

Figure 3A:
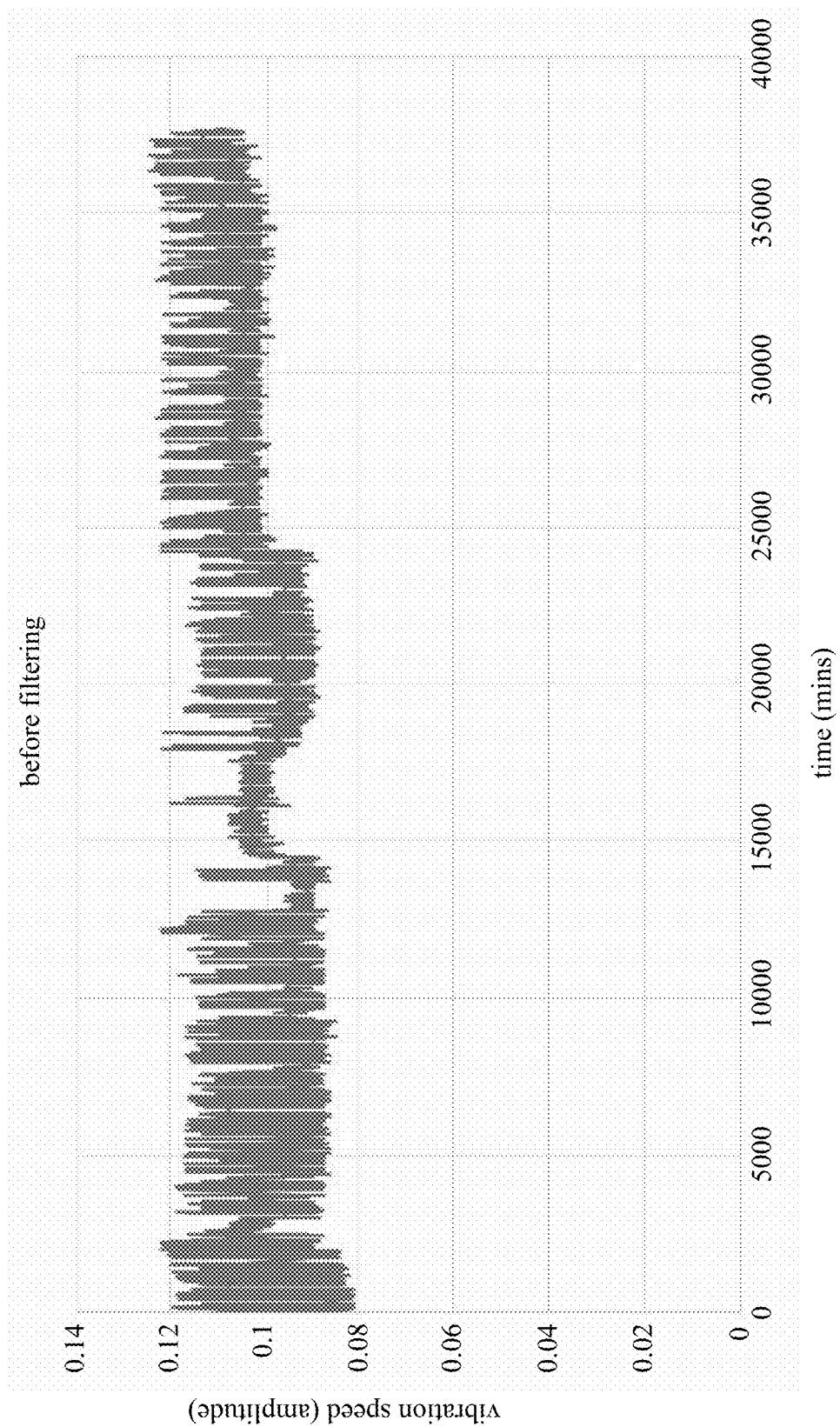
FIGS. 3A and 3B illustrate a filtering process of a data processing method according to the present disclosure.

In an embodiment, the target information comprises data of the target device 9 at a working stage and at an idling stage when a machine has no load and the electronic device 1a has not process data yet (e.g., data before filtered shown in FIG. 3A). At the working stage the working chamber S is performing the semiconductor wafer fabrication process, and at the idling stage the working chamber S does not perform the semiconductor wafer fabrication process. In an embodiment, the target information is based on raw data, such as vibration data of the target device 9 sensed on the scene and/or central management system (CMS) data (e.g., current data of a vacuum pump) provided by manufacturers.

In step S21, a reception portion 11 of the electronic device 1a receives the target information of the sensing portion 10.

Figure 3B:
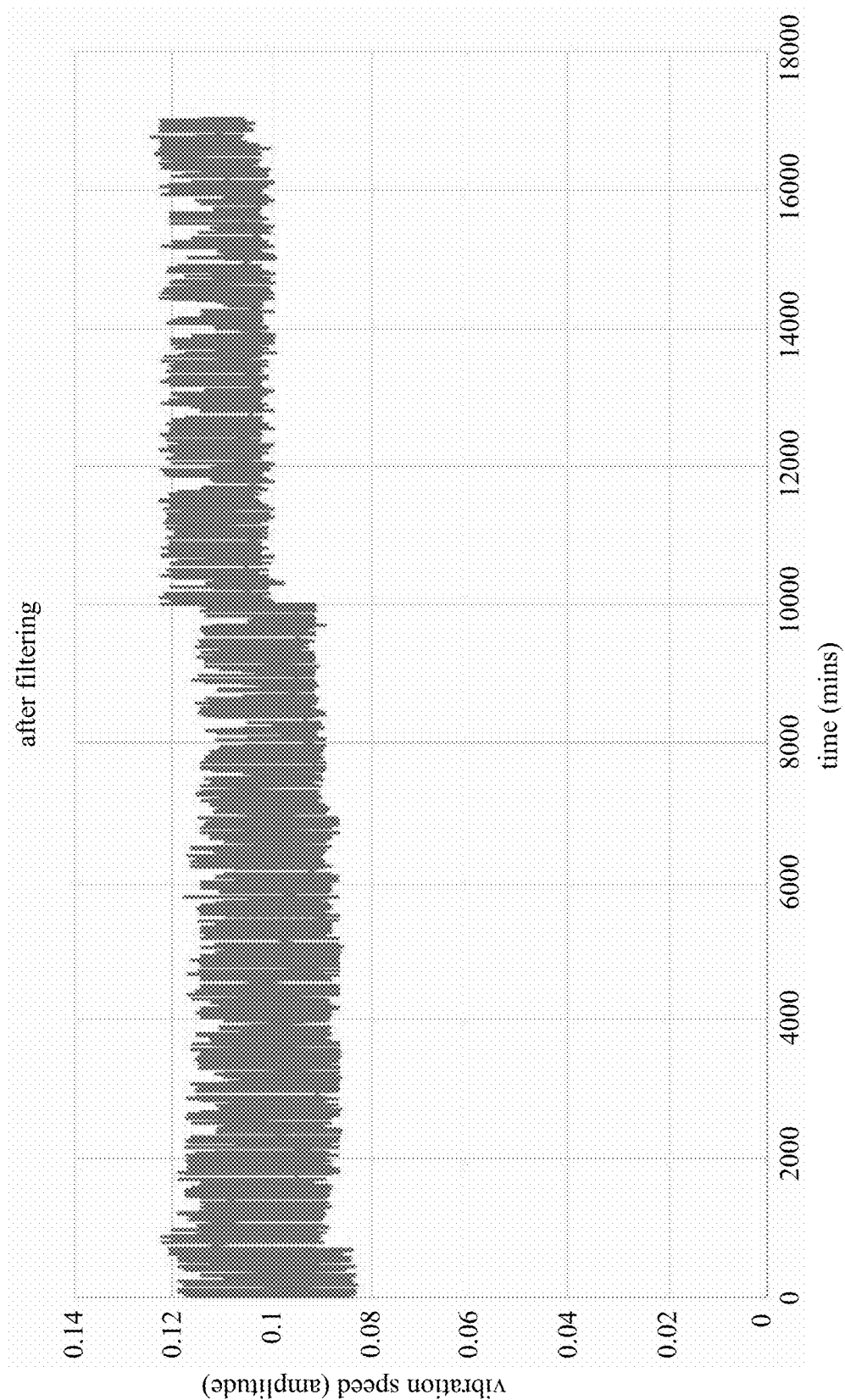

In an embodiment, the electronic device 1a selects needed data (e.g., sub-step S210), and filters the needed data (e.g., sub-step S211) to obtain filtered data shown in FIG. 3B. The reception portion 11 has filtering conditions as follows.

The first filtering condition: a recipe has a multiple sets of data, e.g., 520 sets of data, which define a front segment having 60 sets of data, a middle segment having 10 sets of data, and a rear segment having 450 sets of data. The data of the middle segment is filtered out, and the data of the front and rear segments are captured.

The second filtering condition: the standard deviation of the data of the front segment has to be less than a threshold of the data of the front segment, and the standard deviation of the data of the rear segment has to be less than a threshold of the data of the rear segment. The thresholds of the data of the front and rear segments are weighting values trained by a quasi-neural network by collecting data for a long period of time. In an embodiment, the standard deviation of the data of the front segment has to be less than 0.25, and the standard deviation of the data of the rear segment has to be less than 0.14. In another embodiment, the data (point number) of the rear segment exceeding a base line has to be greater than 30 sets. The base line=$L_{mean} L_{std}$, wherein $L_{mean}$ is the average value of the rear segment, and $L_{std}$ is the standard deviation of the rear segment.

In step S22, the reception portion 11 of the electronic device 1a processes the target information to form feature information.

In an embodiment, the feature information comprises data of the target device 9 in a working stage, without including data of the target device 9 when a machine is at an idling stage, a maintenance stage and/or a shutdown stage and has no load. In an embodiment, the electronic device 1a converts the filtered data (as shown in FIG. 3B) into a feature table shown in FIG. 3C to be the feature information.

The feature information comprises the following features of data at measurement points:

First, root mean square of time-domain signals:

$$RMS = \sqrt{\frac{\sum_{i=1}^{n} x_i^2}{n}} = \sqrt{\frac{x_1^2 + x_2^2 + \ldots + x_n^2}{n}};$$

Second, vibration speed: calculating the vibration amount according to ISO-10816 vibration detection specification; and Third, a sum of 1-10 times of frequencies: the frequencies discovered from a mechanical structure and corresponding to the construction.

In step S23, the label portion 12 of the electronic device 1a processes the feature information into a label matrix.

In an embodiment, the label portion 12 labels the feature information with a labeling mechanism. In an embodiment, the labeling mechanism includes a cumulative method and a principal component analysis (PCA) method.

Figure 4A:
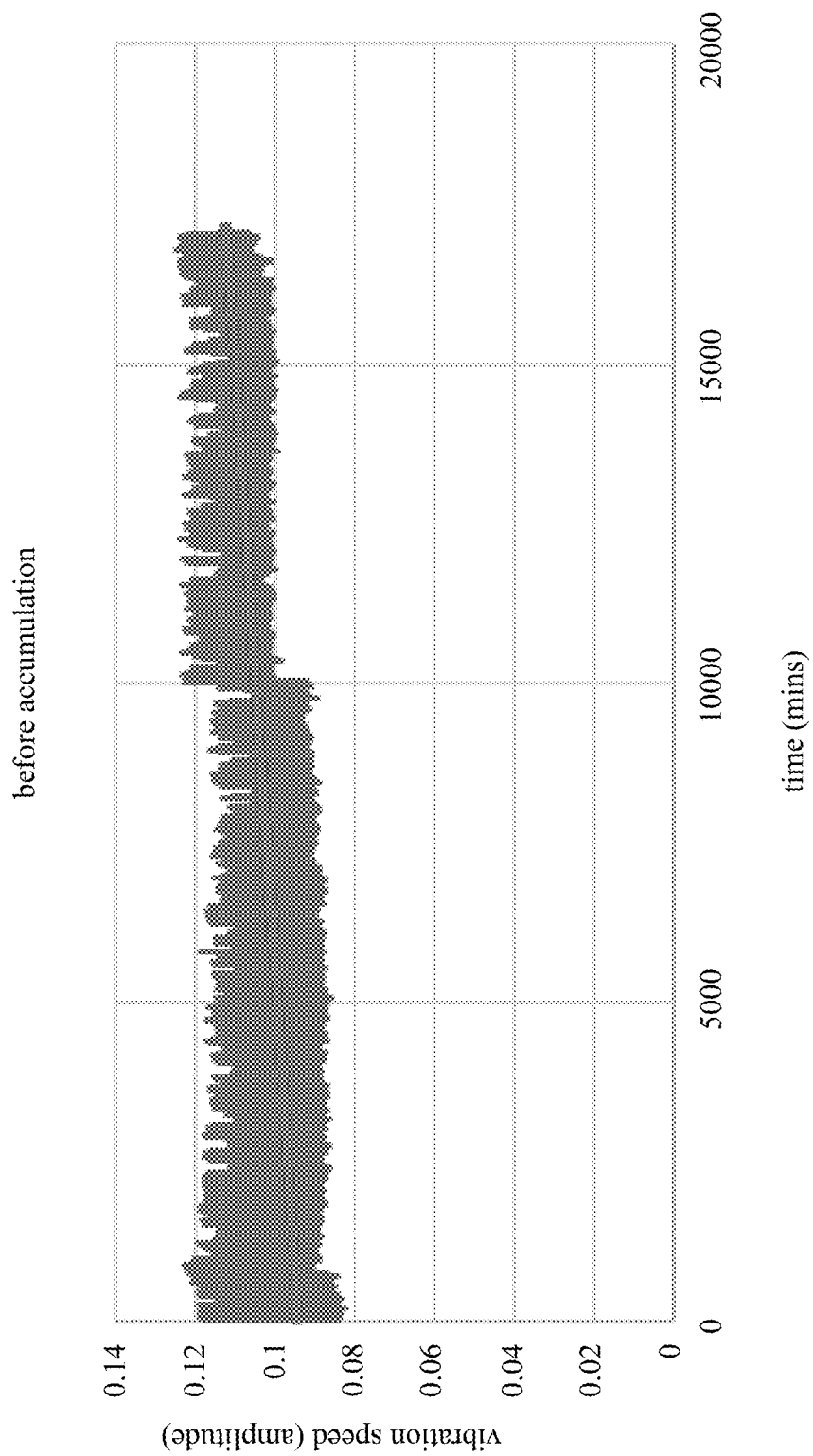
FIGS. 4A and 4B illustrate an accumulation process of a data processing method according to the present disclosure.
Figure 4B:
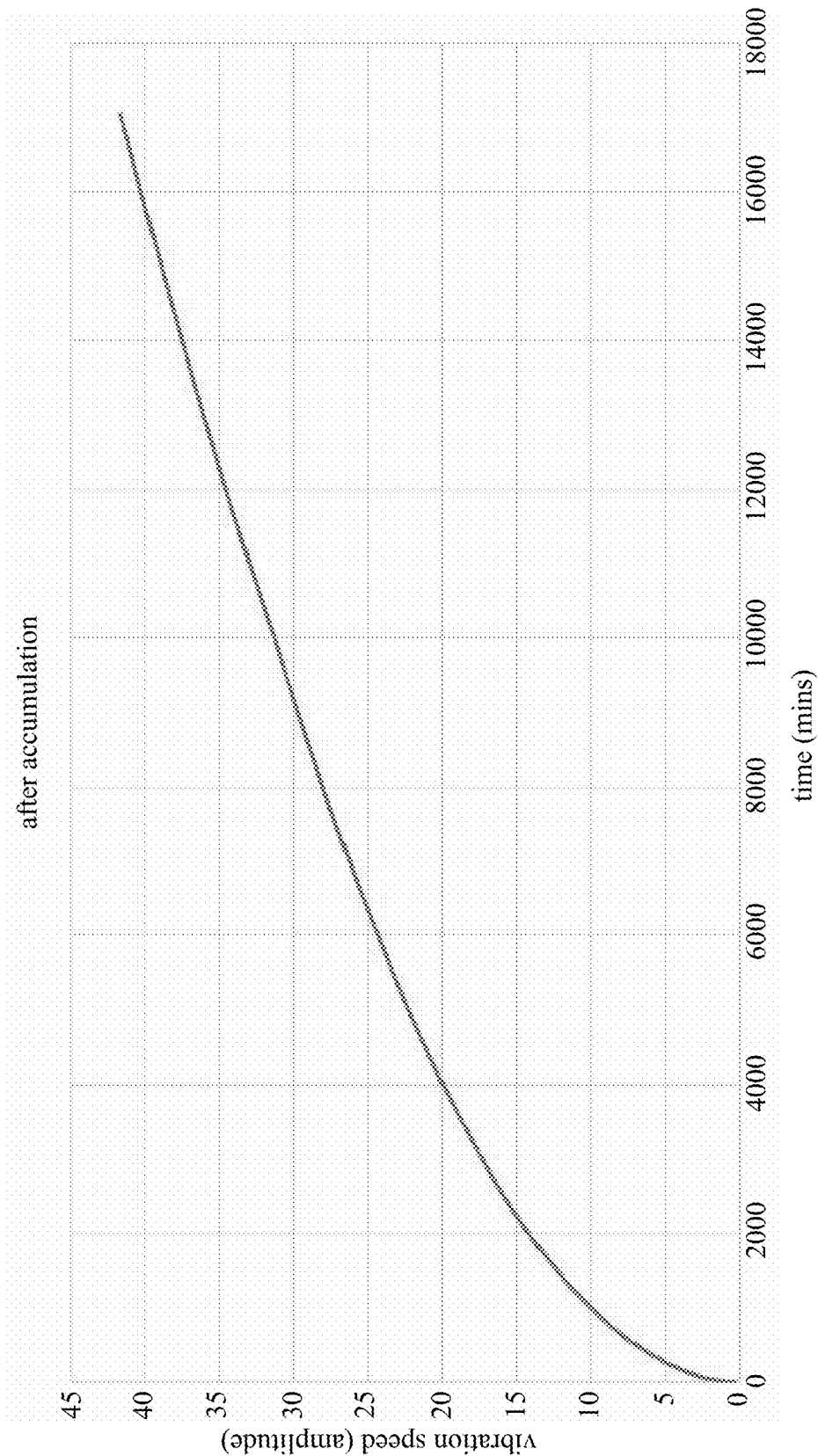

In order to make the trend of the feature information more significant, an accumulative concept is used to process the features. The cumulative method converts the feature information before accumulation (as shown in FIG. 4A or FIG. 3B) into the cumulative features after accumulation (as shown in FIG. 4B). The cumulative method employs a formula as follows:

$$F_c = [\Sigma_{i=1}^{N} F(i)]^{1/2},$$

wherein F represents the feature table of the feature information, and Pc represents the cumulative features.

Figure 4C:
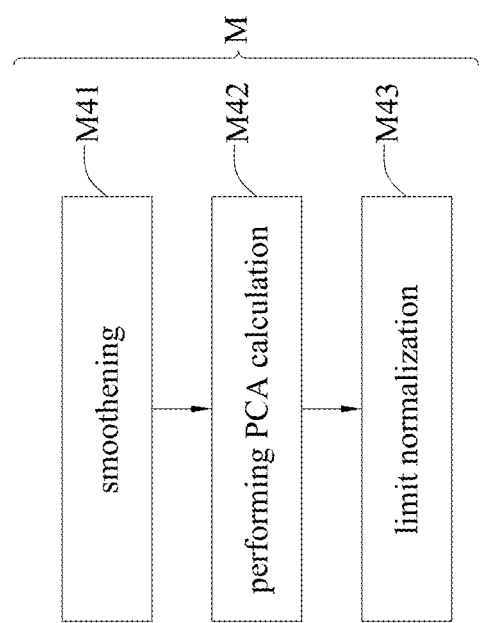
FIG. 4C is a flow chart illustrating how to obtain a label matrix of a data processing method according to the present disclosure.

The label matrix is obtained by calculating the cumulative features according to the principal component analysis method and a min-max normalization (limit normalization) method, i.e., converting $[F_C]$ into [L], wherein L represents a label matrix. The label matrix is obtained by a calculation mechanism M shown in FIG. 4C as follows.

In step M41, a plurality of features of $F_C$ are smoothed by a matlab software, e.g., a rloess method, to obtain new feature information (feature table) $F_{cs}$.

In step M42, PCA calculation is performed. A plurality of features of $F_{cs}$ perform PCA via the matlab software, and the PCA reduces the dimensions of the features that have 12 dimensions to capture PCA_1 (1 level).

Figures 1, 4D:
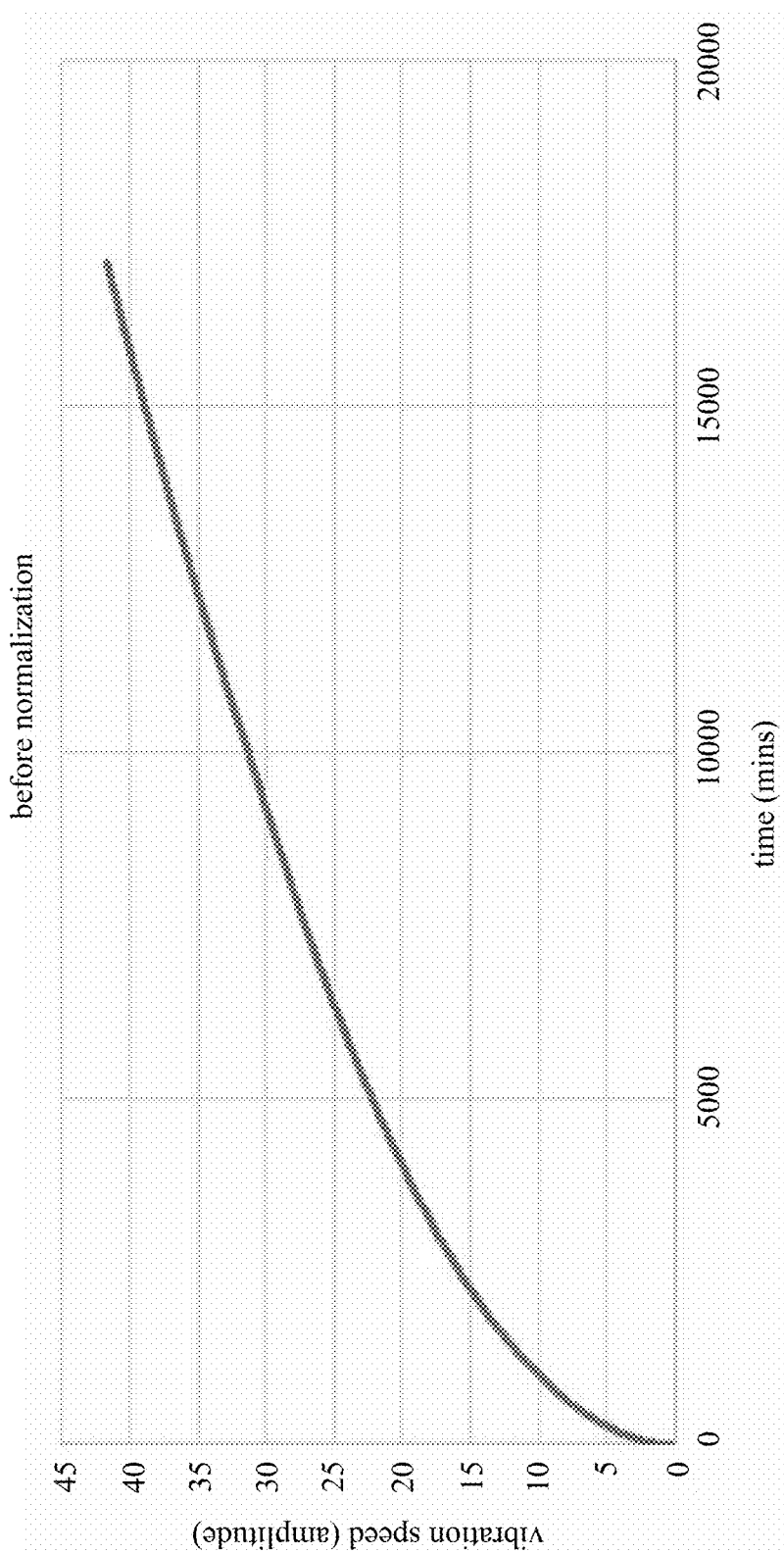
Figures 2, 4D:
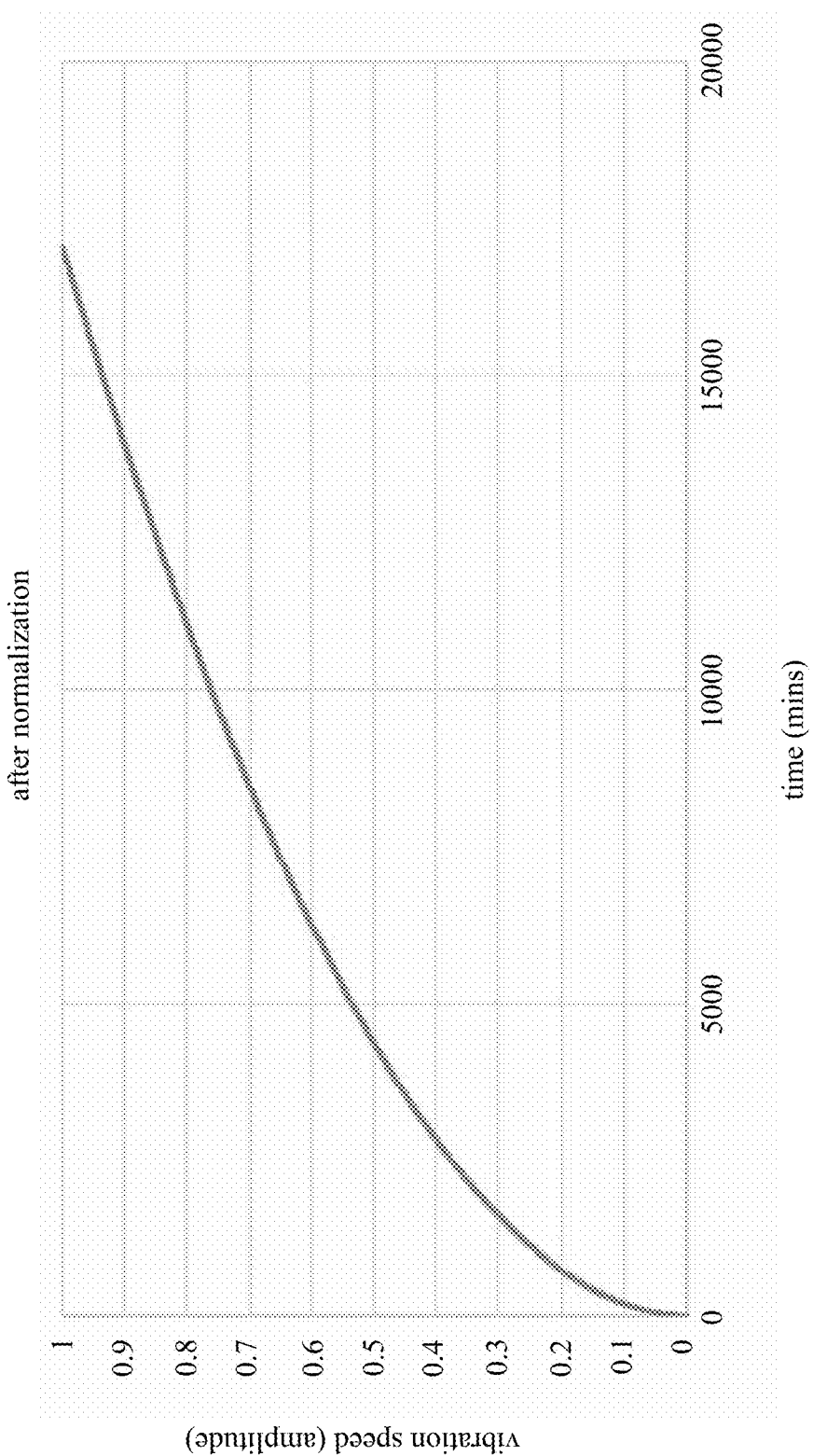

In step M43, PCA_1 is limit-normalized, as shown in the following formula:

$$X_{nom} = \frac{x - x_{min}}{x_{max} - x_{min}} \in [0, 1],$$

wherein x is a feature vector, subscripts min and max represent the minimum and maximum of the feature vector, respectively, and $X_{nom}$ is the result after normalization. Thus, a label matrix L is obtained, as shown in FIGS. 4D-1 and 4D-2.

In steps S24 and S25, the label matrix is established into a target model via an artificial intelligence training method.

Figure 5A:
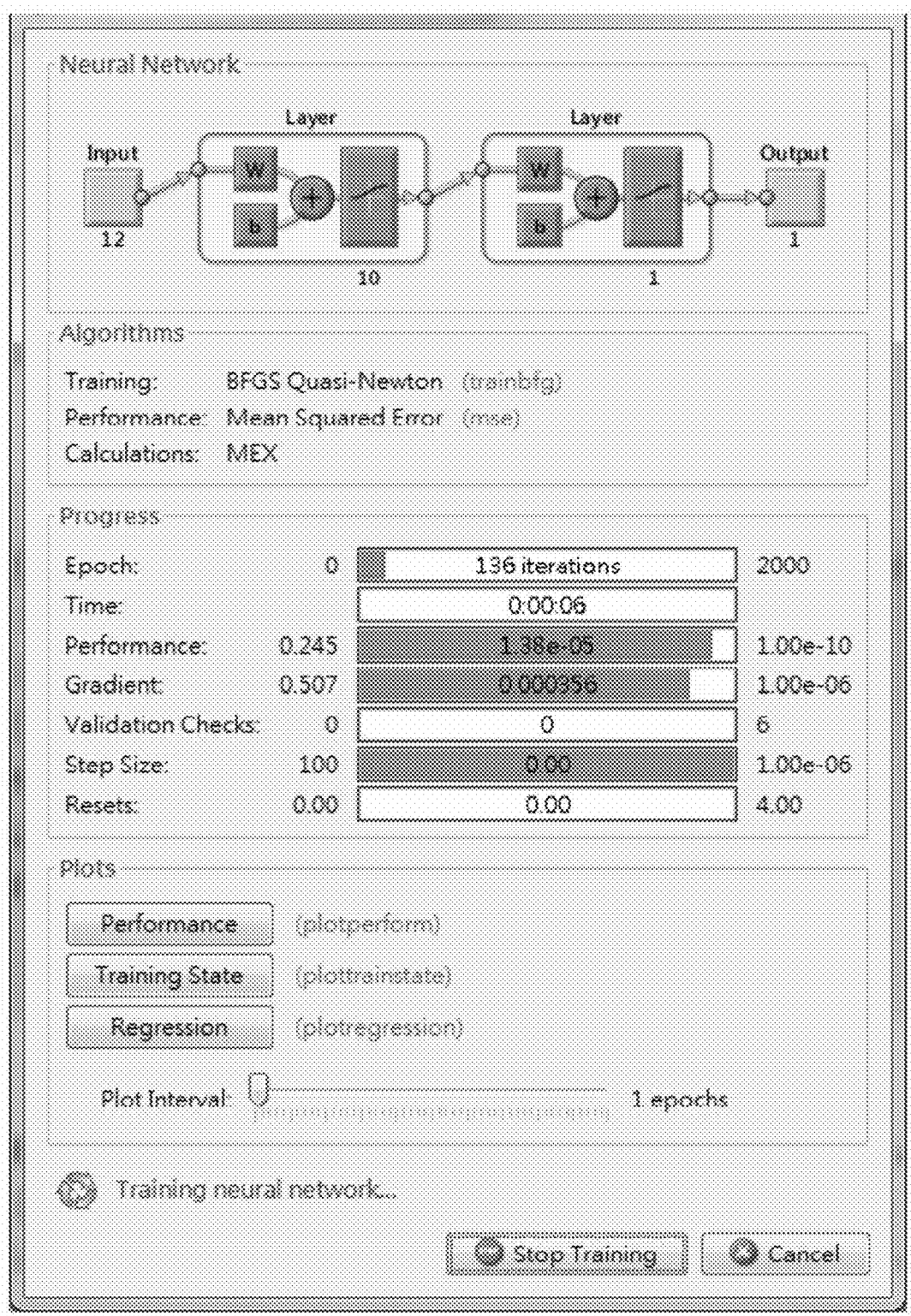
FIG. 5A illustrates a neural network calculation mechanism of a data processing method according to the present disclosure.

In an embodiment, the target model is a deep learning model constituted by a neural network (NN) calculation mechanism (as shown in FIG. 5A), and is constituted by the MATLAB software as follows:

$$[F_c] \text{ } \vdots \text{ } [L] \xrightarrow{NN} \boxed{Model},$$

wherein the target model is represented by an activation function as the following formula:

Function f=input value a·input_weighting W+bias_weighting b=output value, wherein FIGS. 5B and 5C show parameters of the bias_weighting, and FIGS. 5B' and 5C' show the parameters corresponding to the input_weighting of FIGS. 5B and 5C, respectively.

In step S26, the reception portion 11 of the electronic device 1a captures the real-time information of the target device 9.

In an embodiment, the real-time information processes the real-time signals, which are processed by the electronic device 1a (e.g., steps S20-S23) and input to the target model.

Figure 6:
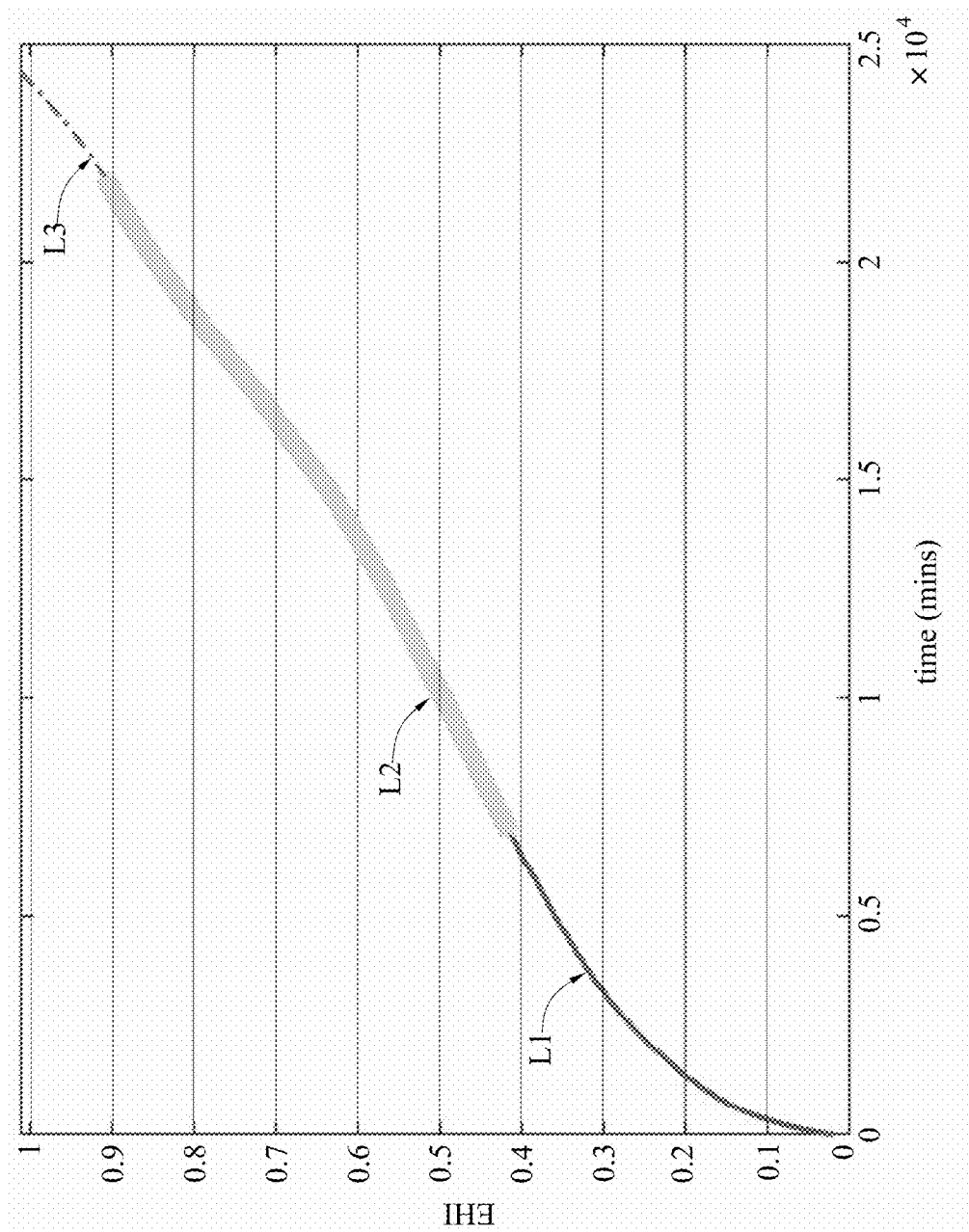
FIG. 6 is a correspondence table of equipment health index and time generated when a data processing method is operating a target model according to the present disclosure.

In step S27, the prediction portion 13 predicts predicted information of a life limit of the target device 9 via the operation of the target model (as shown in FIG. 6). A content of the target information is corresponding to a content of the real-time information.

In an embodiment, the content of the target information is in the same unit (e.g., vibration data) as the unit of the content of the real-time information (e.g., vibration data), and the content of the target information has a different value (e.g., vibration data) from a value of the content of the real-time information (e.g., vibration data).

An autoregressive moving average model (ARMA) is used to represent equipment health index (EHI) time table (as shown in FIG. 6). The prediction portion 13 of the electronic device 1a obtains the predicted information of the life limit of the target device 9 via the chart (as shown in FIG. 6). The curve of FIG. 6 includes a real-time information segment L1, a target model segment L2 and a prediction segment L3.

The autoregressive moving average model is a method to study time sequences, and is constituted by "combining" an autoregressive (AR) model and a moving average (MA) model as follows:

$$\text{ARMA}(p,q) \text{ model: } X_t = c + \varepsilon_t + \sum_{i=1}^{p} \varphi_i X_{t-i} + \sum_{j=1}^{q} \theta_j \varepsilon_{t-i},$$

wherein $\varphi_1, \ldots, \varphi_p$ are AR model parameters, $\theta_1, \ldots, \theta_q$ are MA model parameters, c is a constant, and $\varepsilon_t$ is white noise signals.

Figure 7A:
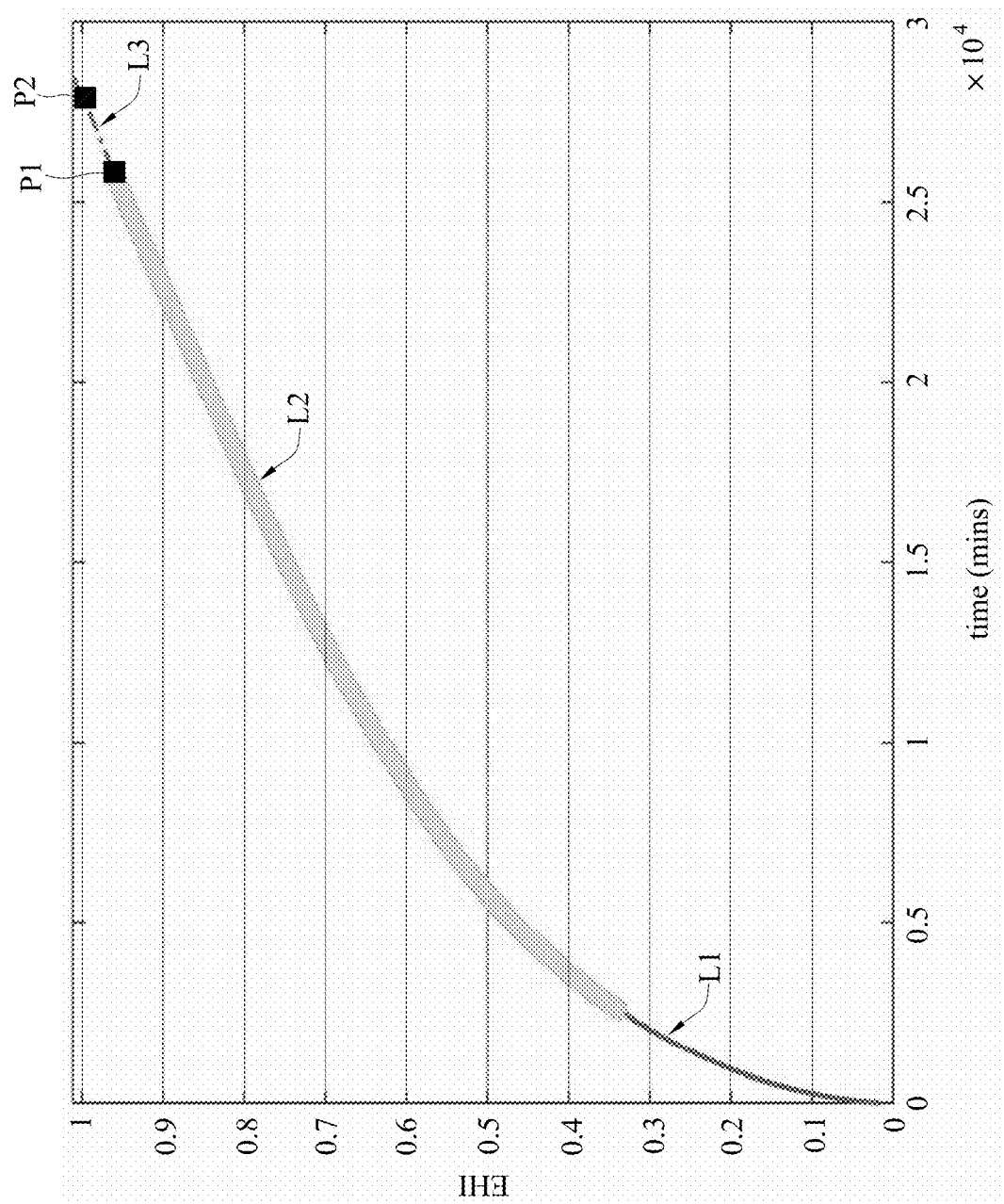
FIGS. 7A to 7D are correspondence tables of equipment health index and time generated when a data processing method is conducting an actual prediction process according to the present disclosure.

In an actual predicting process, as shown in FIG. 7A, the data of the target device 9 in the first operation are used to establish the target model, and prediction is performed based on the data of the target device 9 in the third operation. The collected vibration features are analyzed through the flow process established by EHI, and the needed result data can be obtained. The result data include a training result P1 of a target model of a total number of vibration capture data being the $96^{th}$ and a prediction result P2 of the total number of a life cycle of the target device 9 being the $128^{th}$ (i.e., a predicted life limit), and the actual machine changing is the $106^{th}$, which indicates a normal machine changing state.

Figure 7B:
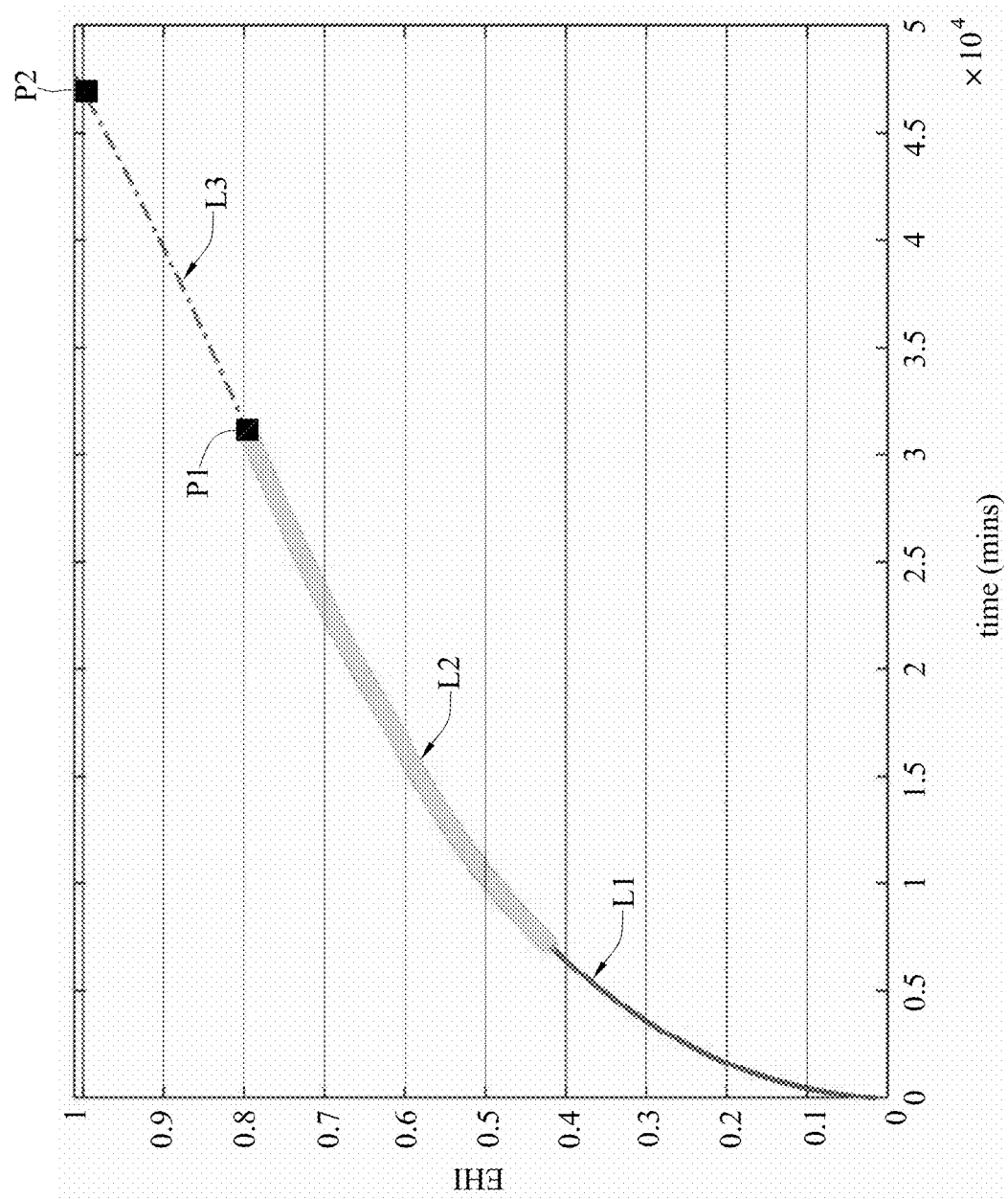

In another actual predicting process, as shown in FIG. 7B, the data of the target device 9 in the first operation are used to establish a target model, and the prediction is performed based on the data of the target device 9 in the sixth operation. The collected vibration features are analyzed based on the process flow established through EHI, and the needed result data can be obtained. A training result P1 of a target model of a total number of vibration capture data is the $95^{th}$, a prediction result P2 of the total number of a life cycle of the target device 9 being the $103^{rd}$ (i.e., a predicted life limit), and the actual machine changing is the $98^{th}$, which indicates a normal machine changing state.

Figure 7C:
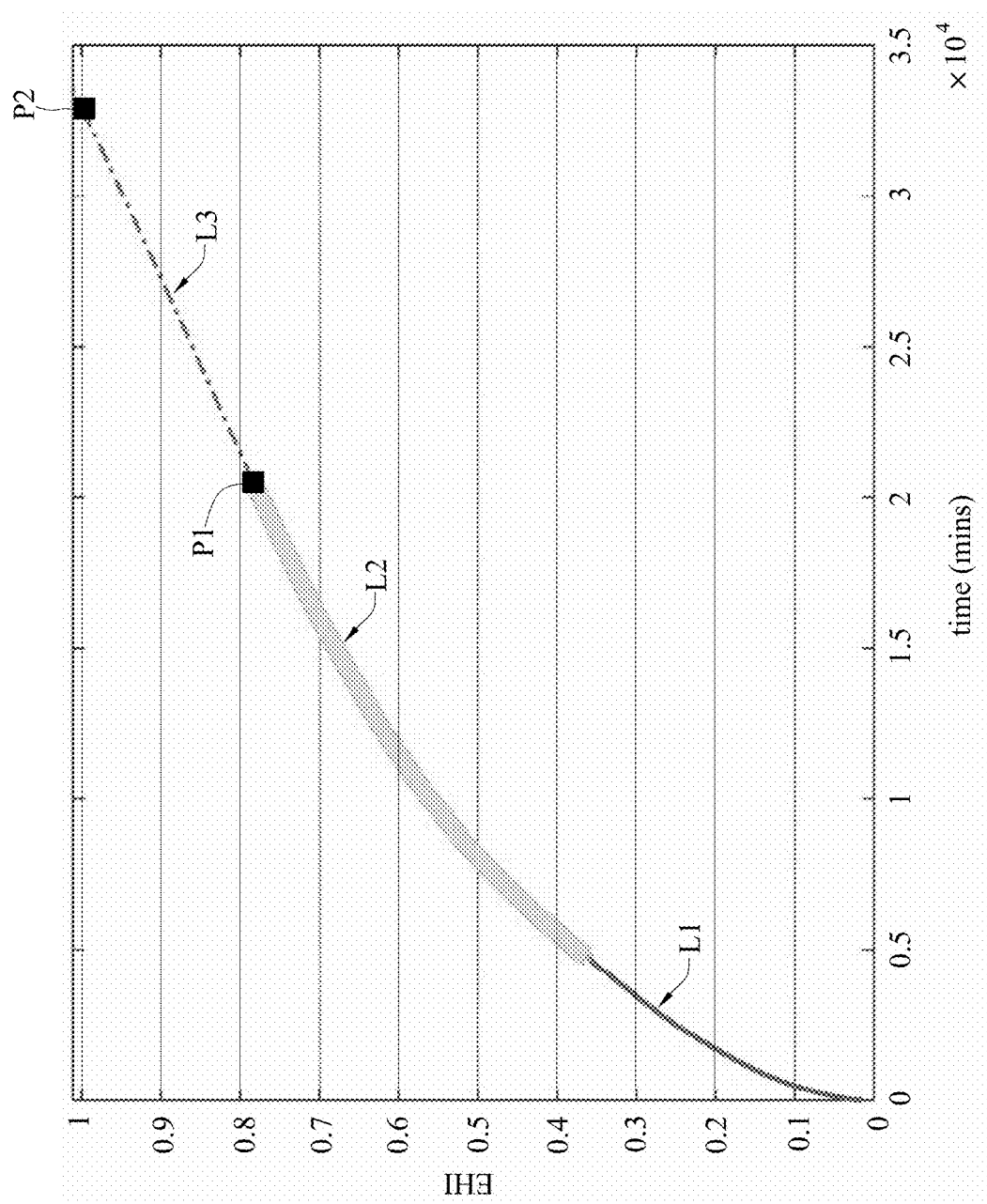

In another actual predicting process, as shown in FIG. 7C, the data of the target device 9 in the first operation are used to establish a target model, and the prediction is performed based on the data of the target device 9 in the third operation. The collected vibration features are analyzed based on the process flow established through EHI, and the needed result data can be obtained. A training result P1 of a target model of a total number of vibration capture data is the $60^{th}$, a prediction result P2 of the total number of a life cycle of the target device 9 being the $70^{th}$ (i.e., a predicted life limit), and the actual machine changing is the $60^{th}$, which indicates a normal machine changing state.

Figure 7D:
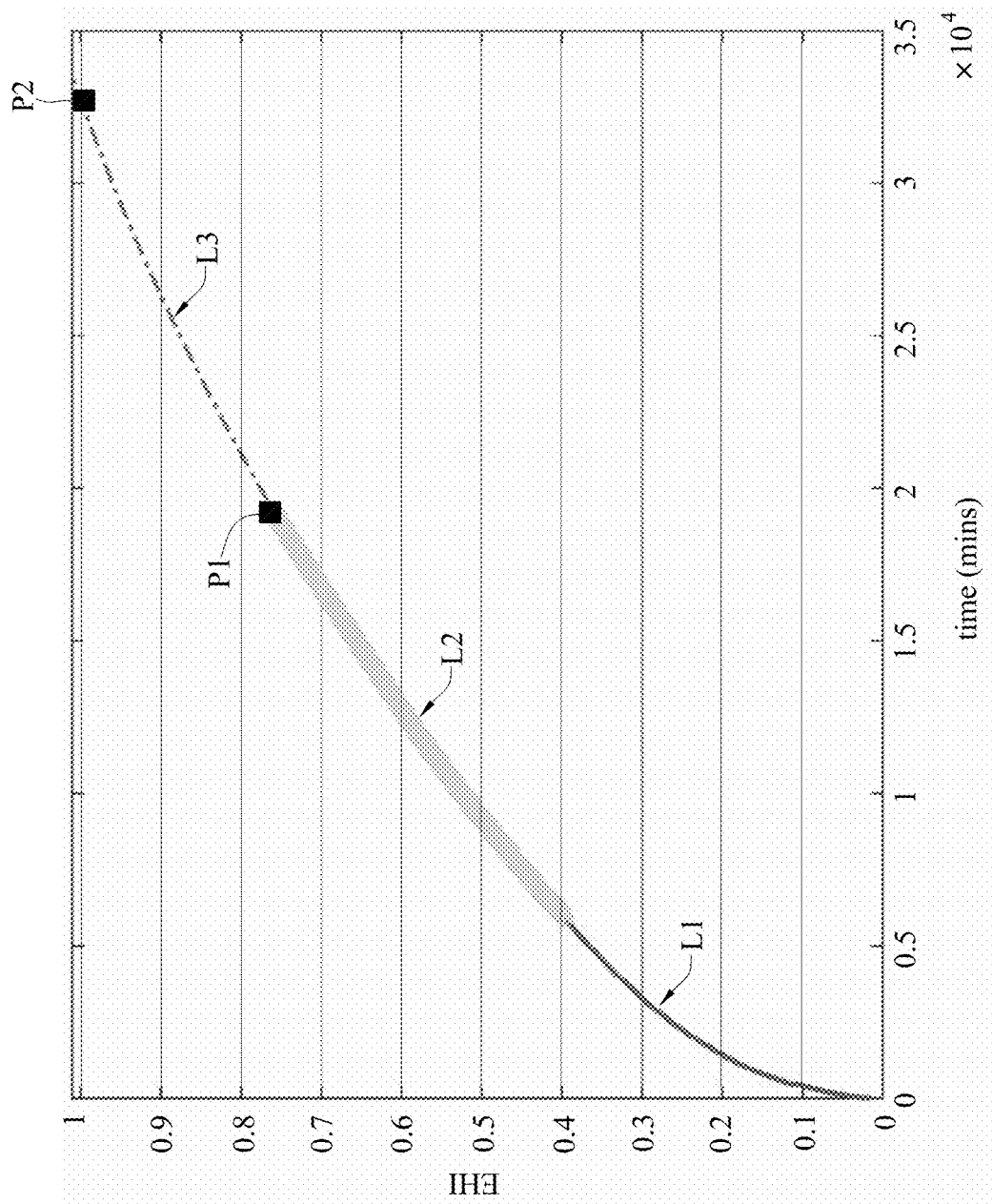

In another actual predicting process, as shown in FIG. 7D, the data of the target device 9 in the first operation are used to establish a target model, and the prediction is performed based on the data of the target device 9 in the first operation. The collected vibration features are analyzed based on the process flow established through EHI, and the needed result data can be obtained. A training result P1 of a target model of a total number of vibration capture data is the $36^{th}$, a prediction result P2 of the total number of a life cycle of the target device 9 being the $51^{st}$ (i.e., a predicted life limit), and the actual machine changing is the $36^{th}$, which indicates a normal machine changing state.

In the data processing method and the data processing system according to the present disclosure, the label portion of the electronic device processes the feature information formed by the target information into the label matrix. Thus, a good target model is constituted and is advantageous in training artificial intelligence. Compared with the prior art, the present disclosure employs a simple calculation process of the target model when predicting a life limit of a vacuum pump. The life time can be predicted very quickly and accurately. Therefore, the demand required by a modern semiconductor wafer fabrication process for the replacement of a vacuum pump is satisfied.

The present disclosure provides a non-transitory computer readable medium stored with a program, which, when loaded into and executed by a computer, achieves the previously described data processing method. In an embodiment, the non-transitory computer readable medium is a compact disk.

It will be apparent to those skilled in the art that various modifications and variations can be made to the disclosed embodiments. It is intended that the specification and examples be considered as exemplary, with a true scope of the disclosure being indicated by the following claims and their equivalents.

What is claimed is:

1. A data processing method, comprising:
   sensing, via at least one sensor, target information of a target device;
   receiving and processing, via an electronic device, the target information of the sensor to form feature information;
   processing, via the electronic device, the feature information into a label matrix, and establishing, via an artificial intelligence training method, a target model based on the label matrix, wherein the electronic device labels the feature information according to a cumulative method and a principal component analysis method, the cumulative method converts the feature information before accumulation into a cumulative feature after accumulation, and the label matrix is obtained by calculating the cumulative feature after accumulation according to the principal component analysis method and a min-max normalization method; and
   after the electronic device captures real-time information of the target device, predicting, via the target model, a life limit of the target device, wherein a content of the target information is corresponding to a content of the real-time information.

2. The data processing method of claim 1, wherein the feature information includes data of the target device at a working stage, without including data of the target device when a machine is at an idling stage, a maintenance stage and/or a shutdown stage and has no load.

3. The data processing method of claim 1, wherein the sensor is an acceleration sensor connected to the target device.

4. The data processing method of claim 1, wherein the target device is a vacuum pump in communication with a working chamber of a semiconductor wafer fabrication process.

5. The data processing method of claim 1, wherein the target model is a deep learning model constituted by a neural network calculation mechanism.

6. The data processing method of claim 1, wherein the real-time information is processed by the electronic device and input to the target model, and the electronic device obtains predicted information of a life limit of the target device.

7. A data processing system, comprising:
   a sensor configured for sensing target information of a target device;
   a receiver communicatively connected to the sensor and configured for receiving and processing the target information to form feature information;
   a label processor communicatively connected to the receiver and configured for processing the feature information into a label matrix, wherein a target model is established by an artificial intelligence training method based on the label matrix, and wherein the label processor processes the feature information by using a cumulative method and a principal component analysis method, the cumulative method converts the feature information before accumulation into a cumulative feature after accumulation, and the label processor obtains the label matrix by calculating the cumulative feature after accumulation according to the principal component analysis method and a min-max normalization method; and a predictor communicatively connected to the receiver and the label processor and configured for predicting a life limit of the target device via the target model after real-time information of the target device is captured, wherein a content of the target information is corresponding to a content of the real-time information.

8. The data processing system of claim 7, wherein the feature information includes data of the target device at a working stage, without including data of the target device when a machine is at an idling stage, a maintenance stage and/or a shutdown stage and has no load.

9. The data processing system of claim 7, wherein the sensor is an acceleration sensor connected to the target device.

10. The data processing system of claim 7, wherein the target device is a vacuum pump in communication with a working chamber of a semiconductor wafer fabrication process.

11. The data processing system of claim 7, wherein the target model is a deep learning model constituted by a neural network calculation mechanism.

12. The data processing system of claim 7, wherein the real-time information is processed by the receiver and the label processor and input to the target model, and the predictor obtains predicted information of a life limit of the target device.

13. A non-transitory computer readable medium stored with a program, which, when loaded into and executed by a computer, achieves the data processing method of claim 1.

* * * * *